United States Patent
Silva et al.

(10) Patent No.: US 7,176,421 B2
(45) Date of Patent: Feb. 13, 2007

(54) STRAIGHT RIBBON HEATER

(75) Inventors: Mark Rudolph Silva, Alta Loma, CA (US); David Lau, Redondo Beach, CA (US)

(73) Assignee: TransDigm Inc., Cleveland, OH (US)

( * ) Notice: Subject to any disclaimer, the term of this patent is extended or adjusted under 35 U.S.C. 154(b) by 22 days.

(21) Appl. No.: 10/935,149

(22) Filed: Sep. 8, 2004

(65) Prior Publication Data

US 2005/0194378 A1    Sep. 8, 2005

Related U.S. Application Data (60) Provisional application No. 60/549,912, filed on Mar. 5, 2004.

(51) Int. Cl.
*H05B 3/56* (2006.01)
*H05B 3/18* (2006.01)
*H01C 3/18* (2006.01)

(52) U.S. Cl. .......... 219/544; 219/548; 219/542; 219/528; 219/546; 219/549; 392/314; 338/314; 338/301; 338/302; 338/311

(58) Field of Classification Search ........... 219/528, 219/549, 548, 546, 542; 392/314; 338/299, 338/296, 301, 302, 306, 311
See application file for complete search history.

(56) References Cited

U.S. PATENT DOCUMENTS

| 2,683,673 | A |   | 7/1954  | Silversher ............ 117/71 |
|-----------|---|---|---------|-------------------------------|
| 2,710,909 | A |   | 6/1955  | Logan et al. ............ 219/46 |
| 2,719,907 | A |   | 10/1955 | Combs ............... 219/46 |
| 3,031,739 | A |   | 5/1962  | Boggs ............... 29/155.63 |
| 3,740,529 | A | * | 6/1973  | Falk ............... 219/535 |
| 3,861,029 | A | * | 1/1975  | Smith-Johannsen et al. .. 29/611 |
| 4,186,294 | A | * | 1/1980  | Bender ............. 219/527 |
| 4,281,238 | A | * | 7/1981  | Noma et al. ............ 219/535 |
| 4,309,597 | A | * | 1/1982  | Crowley ............. 219/549 |
| 4,346,277 | A | * | 8/1982  | Wojtecki et al. ........ 219/528 |
| 4,348,584 | A | * | 9/1982  | Gale et al. ........... 219/549 |
| 4,427,877 | A | * | 1/1984  | Dhingra ............. 219/548 |
| 4,429,215 | A | * | 1/1984  | Sakai et al. ........... 219/528 |
| 4,695,703 | A | * | 9/1987  | Williams et al. ......... 219/212 |

(Continued)

FOREIGN PATENT DOCUMENTS

DE    10036059 A1    7/2000

(Continued)

*Primary Examiner*—Robin Evans
*Assistant Examiner*—Stephen J. Ralis
(74) *Attorney, Agent, or Firm*—Baker & Hostetler LLP (57) ABSTRACT

A heater for heating a rigid fluid line or hose for freeze protection. The heater has a base made of an outer base layer, a middle base layer attached to the outer base layer; and an inner base layer attached to the middle base layer. The inner base layer can be uncured silicone (before assembly processing). A resistance wire is wound around an electrically non-conductive core and located on the inner base layer. The resistance wire can be a high gauge wire providing for a small moment of flexure. A cover includes an inner cover layer covering said resistance wire. This inner cover layer can be uncured silicone (before assembly processing). A middle cover layer is attached to the inner cover layer, and an outer cover layer is attached to the inner cover layer. The outer cover layer protects the heater from abrasion.

22 Claims, 7 Drawing Sheets

U.S. PATENT DOCUMENTS

| | | | |
|---|---|---|---|
| 4,735,858 A * | 4/1988 | Hosokawa et al. | 428/390 |
| 5,138,684 A | 8/1992 | Bullock et al. | 385/113 |
| 5,408,071 A * | 4/1995 | Ragland et al. | 219/530 |
| 5,454,512 A * | 10/1995 | Berlaimont et al. | 237/79 |
| 5,883,364 A | 3/1999 | Frei et al. | 219/535 |
| 5,910,266 A * | 6/1999 | Jones | 219/528 |
| 5,938,963 A * | 8/1999 | Tanis | 219/551 |
| 5,945,020 A * | 8/1999 | Kuroda et al. | 219/543 |
| 6,018,137 A | 1/2000 | Reiff | 219/205 |
| 6,021,523 A * | 2/2000 | Vero | 2/159 |
| 6,084,206 A * | 7/2000 | Williamson et al. | 219/212 |
| 6,263,158 B1 | 7/2001 | Rutherford | 392/503 |
| 6,420,682 B1 * | 7/2002 | Sellgren et al. | 219/219 |
| 6,668,535 B2 * | 12/2003 | Tanahashi et al. | 57/289 |
| 2001/0014212 A1 * | 8/2001 | Rutherford | 392/503 |
| 2002/0117495 A1 * | 8/2002 | Kochman et al. | 219/549 |
| 2003/0118765 A1 * | 6/2003 | Govaerts et al. | 428/36.91 |
| 2003/0222077 A1 * | 12/2003 | Suda et al. | 219/544 |
| 2005/0140057 A1 * | 6/2005 | Gerndt | 264/284 |
| 2005/0165154 A1 * | 7/2005 | Kosuge et al. | 524/494 |
| 2005/0181692 A1 * | 8/2005 | Okamoto et al. | 442/164 |

FOREIGN PATENT DOCUMENTS

| | | | |
|---|---|---|---|
| JP | 06124771 A | * | 5/1994 |
| JP | 2000266282 A | * | 9/2000 |

* cited by examiner

FIG. 1

| RESISTANCE PER FOOT | ALLOY | QTY ENDS IN PARALLEL | WIRE GAGE | (TURNS PER INCH) |
|---|---|---|---|---|
| 7.96 | 90 OHM | 4 ENDS | 42 | 26.1 |
| 3.31 | 60 OHM | 4 ENDS | 39 | 30.9 |
| 43.6 | ADVANCE | 4 ENDS | 44 | 28.3 |
| 2.35 | 30 OHM | 4 ENDS | 41 | 27.1 |
| 863 | NICHROME | 1 END | 46 | 34.9 |
| 2780 | EVANOHM | 1 END | 48 | 47.9 |
| 16.20 | MIDOHM | 4 ENDS | 42 | 26.5 |
| .59 | COPPER | 4 ENDS | 39 | 31.9 |

WIRE ALLOY NOMINAL COMPOSITION APPROXIMATELY AS SHOWN, FOR REFERENCE ONLY:
COPPER: 100% COPPER                                                  10 OHMS/CIRCULAR MIL-FOOT (CMF)
ALLOY 30: 2.25% NICKEL          97.75% COPPER                         30 OHMS/CMF
ALLOY 60: 6% NICKEL             94% COPPER                            60 OHMS/CMF
ALLOY 90: 12% NICKEL            88% COPPER                            90 OHMS/CMF
MIDOHM:   23% NICKEL            77% COPPER                            180 OHMS/CMF
ADVANCE:  45% NICKEL            55% COPPER                            300 OHMS/CMF
NICHROME: 60% NICKEL, 16% CHROMIUM, 24% IRON,                         675 OHMS/CMF
EVANOHM:  75% NICKEL, 20% CHROMIUM, 2.5% ALUMINUM, 2.5% COPPER,       800 OHMS/CMF

STRAIGHT RIBBON HEATER

PRIORITY CLAIM

This application claims priority to the provisional U.S. patent application entitled, Straight Ribbon Heater, filed Mar. 5, 2004, having Ser. No. 60/549,912, the disclosure of which is incorporated herein by reference.

FIELD OF THE INVENTION

The present invention relates to heaters. More particularly the invention relates to heaters placed on a surface of a rigid fluid line or hose. One application of the technology is to use these types of heaters in an airframe to provide a heat source for freeze protection of waste and potable water hoses and rigid fluid lines. The present invention, however, can be used in other areas known to those skilled in the art.

BACKGROUND OF THE INVENTION

Heaters are used to provide freeze protection for commercial transport aircraft, regional jet, and corporate and business jet markets with the principal focus on potable and waste water systems. Applications in which theses heaters can be used are waste ducting, potable water hose and plumbing, waste water drain lines, flush/fill and potable water fittings, water and hydraulic valves, and water tanks and heated vessels.

SUMMARY OF THE INVENTION

There is a need in the industry for heaters that are durable and capable of withstanding impact. There is also a need for heaters that are capable of withstanding scrape abrasion, cut through, twist and flexure tests to ensure that the heaters do not malfunction. If the heaters do malfunction, the hoses or rigid lines will freeze thereby causing overflow. There is also a need for these heaters to be light weight and non-flammable to meet aircraft requirements.

There is thus a need for a heater which is more easily attached to a surface and that can withstand the stress and strains of flexure and abrasion.

In one embodiment of the invention the heater includes a base having an outer base layer and a middle base layer attached to said outer base layer. An inner base layer is attached to the middle base layer. A resistance wire is wound around an electrically non-conductive core and located on the inner base layer. A cover is provided that covers the resistance wire. The cover has an inner cover layer covering the resistance wire, a middle cover layer attached to the inner cover layer, and an outer cover layer.

The outer base and the outer cover are made of a polyester-polyarylate fiber in one embodiment of the invention.

The outer base layer and the outer cover layer can, alternatively, be made of a liquid crystal polymer fiber in another embodiment of the invention.

The middle base layer and the middle cover layer are silicone in one embodiment of the invention.

The middle base layer and the middle cover layer are cured silicone in another embodiment of the invention.

The inner base layer and the inner cover layer are silicone in one embodiment of the invention.

The inner base layer and the inner cover layer are uncured silicone in another embodiment of the invention (before processing).

In another embodiment of the invention, the electrically non-conductive core is a fiberglass core.

The invention can further include a thermostat connected to the resistance wire in another embodiment of the invention.

In another embodiment of the invention, lead wires are connected to the resistance wires.

The resistance wire, in an alternate embodiment of the invention, is helically wound around the electrically non-conductive core.

The base and cover, in another embodiment of the invention, are attached by heating.

In an alternate embodiment of the invention, the base and cover are attached through vulcanization.

The base and cover, in another embodiment of the invention, are attached by peroxide cure reaction of the base and cover and heating the base and cover.

The invention in an alternate embodiment is a method for making a heater including providing a base having: an outer base layer; a middle base layer attached to the outer base layer; and an inner base layer attached to the middle base layer. A resistance wire wound around an electrically non-conductive core is provided on the inner base layer; and a cover is provided that covers the resistance wire. The cover has an inner cover layer covering the inner base layer and the heating element (a.k.a. resistance wire); a middle cover layer attached to the inner cover layer; and an outer cover layer. The cover is attached to the base.

In one embodiment of the invention the cover and the base are attached through heat treatment.

In another embodiment of the invention the cover and base are attached by peroxide cure reaction of the inner base layer and the inner cover layer; and heat treating the cover and the base.

In an alternate embodiment of the invention the cover and the base are attached by vulcanizing the cover and the base.

In an alternate embodiment of the invention a system for heating includes a means for providing a base having: an outer base layer; a middle base layer attached to the outer base layer; and an inner base layer attached to the middle base layer. The system further includes a means for providing a resistance wire wound around an electrically non-conductive core on the inner base layer; and a means for providing a cover that covers the inner base layer and the heating element (a.k.a. resistance wire). The cover has an inner cover layer covering the resistance wire; a middle cover layer attached to the inner cover layer; and an outer cover layer. The system further includes a means for attaching the cover to the base.

In one embodiment of the invention, the means for attaching includes a means for heat treating the cover and the base.

In an alternate embodiment of the invention, the means for attaching includes a peroxide cure reaction of the inner base layer and the inner cover layer; and a means for heat treating the cover and the base.

In another embodiment of the invention, the means for attaching includes vulcanizing the cover and the base.

The invention in yet another embodiment is a method for heating water lines which includes attaching a base of a heater to water lines. The base has an outer base layer; a middle base layer attached to the outer base layer; and an inner base layer attached to the middle base layer. The method further includes providing an electrical current to a resistance wire wound around an electrically non-conductive core where the resistance wire is located on the inner base layer. The method further includes protecting the resistance wire with a cover that covers the resistance wire. The cover has an inner cover layer covering the resistance wire and inner base layer; a middle cover layer attached to the inner cover layer; and an outer cover layer.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

The present invention provides heaters for placing on rigid fluid lines or hoses. These heaters are capable of withstanding impact. The present invention also provides heaters that are capable of withstanding flexure so that, in the event the heaters are moved in a back and forth motion, the wirings will not break inside the heaters thereby causing the heaters to malfunction. If the heaters do malfunction, the hoses or rigid lines will freeze thereby causing overflow. In the aircraft industry this is especially critical in providing safety to passengers, flight staff and crew. This invention is also useful in other industries, especially when it becomes critical to prevent lines or hoses from freezing.

Figure 1:
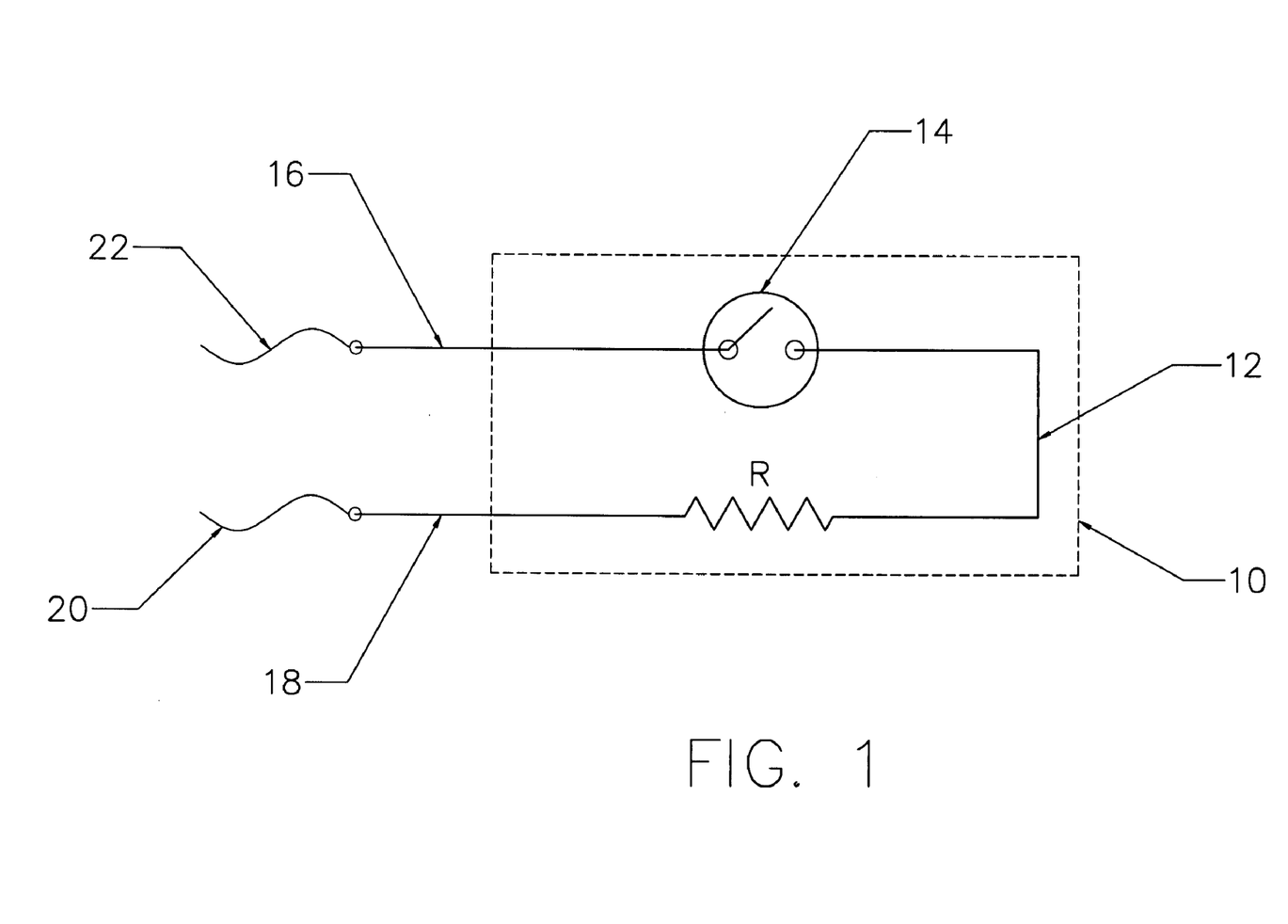
FIG. 1 is a schematic view of a heater of the present invention.

FIG. 1 is a schematic diagram of the present invention. Heater 10 includes a resistance wire 12 that runs through the heater 10. The resistance wire 12 has a resistance R and can have in some embodiments a thermostat 14. Thermostat 14 is used to control the temperature. Each of the lead wires 16 and 18 of the resistance wire 12 are attached to a power source through lines 20 and 22.

Figure 2:
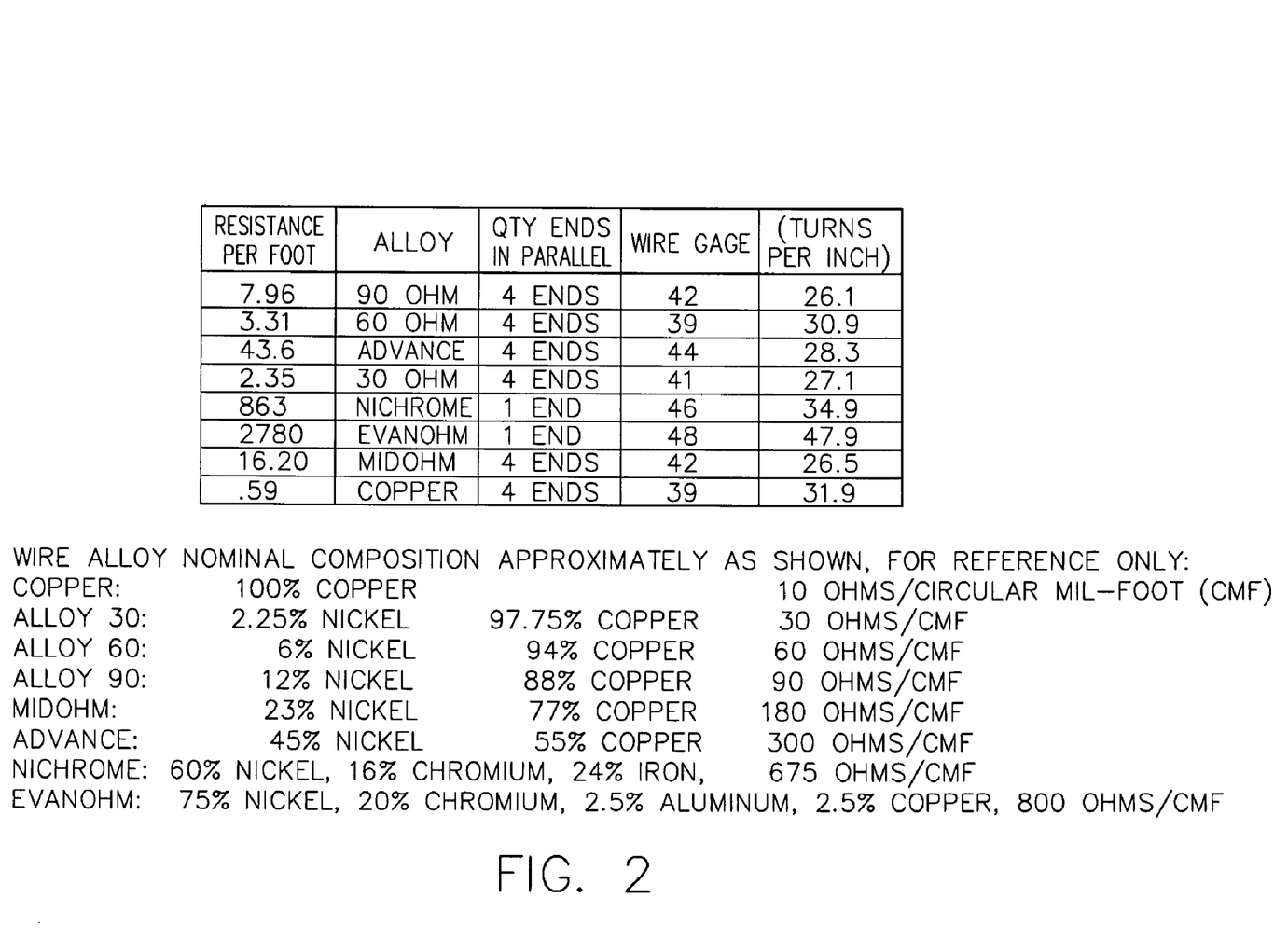
FIG. 2 is a table showing different gauge wires for different alloys used in the present invention.
Figure 7:
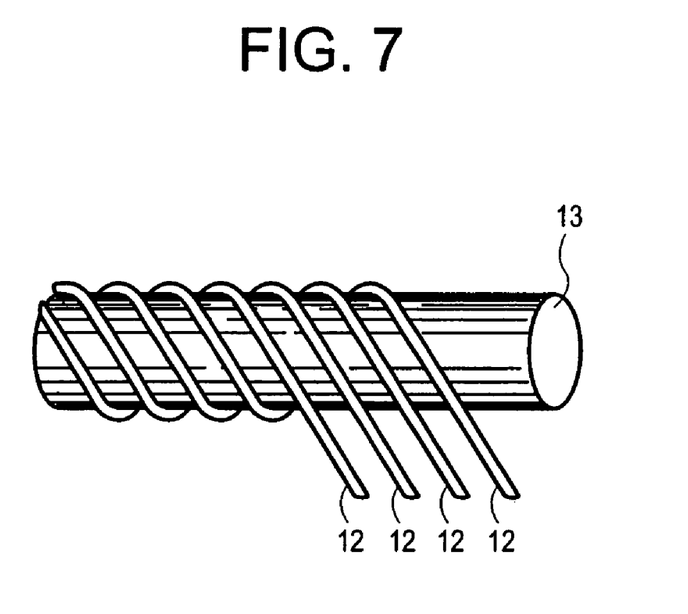
FIG. 7 is an illustration of a plurality of resistance wires helically wound around an electrically non-conductive core.

The resistance wire 12 in some embodiments of the invention can be wound around an electrically non-conductive core 13, as shown in FIG. 7. The core 13 can be a fiberglass core and the resistance wire 12 may be helically wound around the fiberglass core to obtain a desired resistance. It has been found that using a high gauge wire (thin wire) provides for a smaller moment of flexure. Thus, in some embodiments of the invention, it is desirable to use a high gauge wire. A wire having a wire gauge of 48 can be used in some instances. FIG. 2 is a table showing different gauge wires for different alloys used in the present invention. Choosing a high gauge wire as shown for example in the table provided in FIG. 2 will provide a heater that can withstand movement causing the heater to flex or bend. The wire will not break but will be able to stay in tact through such movement.

A wire with a lot of turns is desirable in some embodiments of the invention. The resistance of wire as it gets smaller in general gets larger. The load of the wire can be reduced by providing more turns per inch. The resistance of the wire can then be controlled with the number of turns providing proper resistance for proper heating.

In some embodiments of the invention, special consideration is given to ensure that the wire will withstand conditions leading to repeated flexure of the heater. The wire used in the heater in some cases is of a very high gage/small diameter to minimize deleterious effects of repeated flexure of the heater. In some cases the heater will require a low resistance (as shown in FIG. 2). One solution is to use a single low gage/large diameter wire to save costs associated with material and assembly effort. However in other embodiments of the invention, several small diameter wires connected electrically in parallel are implemented to attain the same low resistance requirement, but also provide enhanced flexure endurance by using higher gage/small diameter wire. In this way flexure performance is maintained while achieving a low resistance factor.

Figure 3:
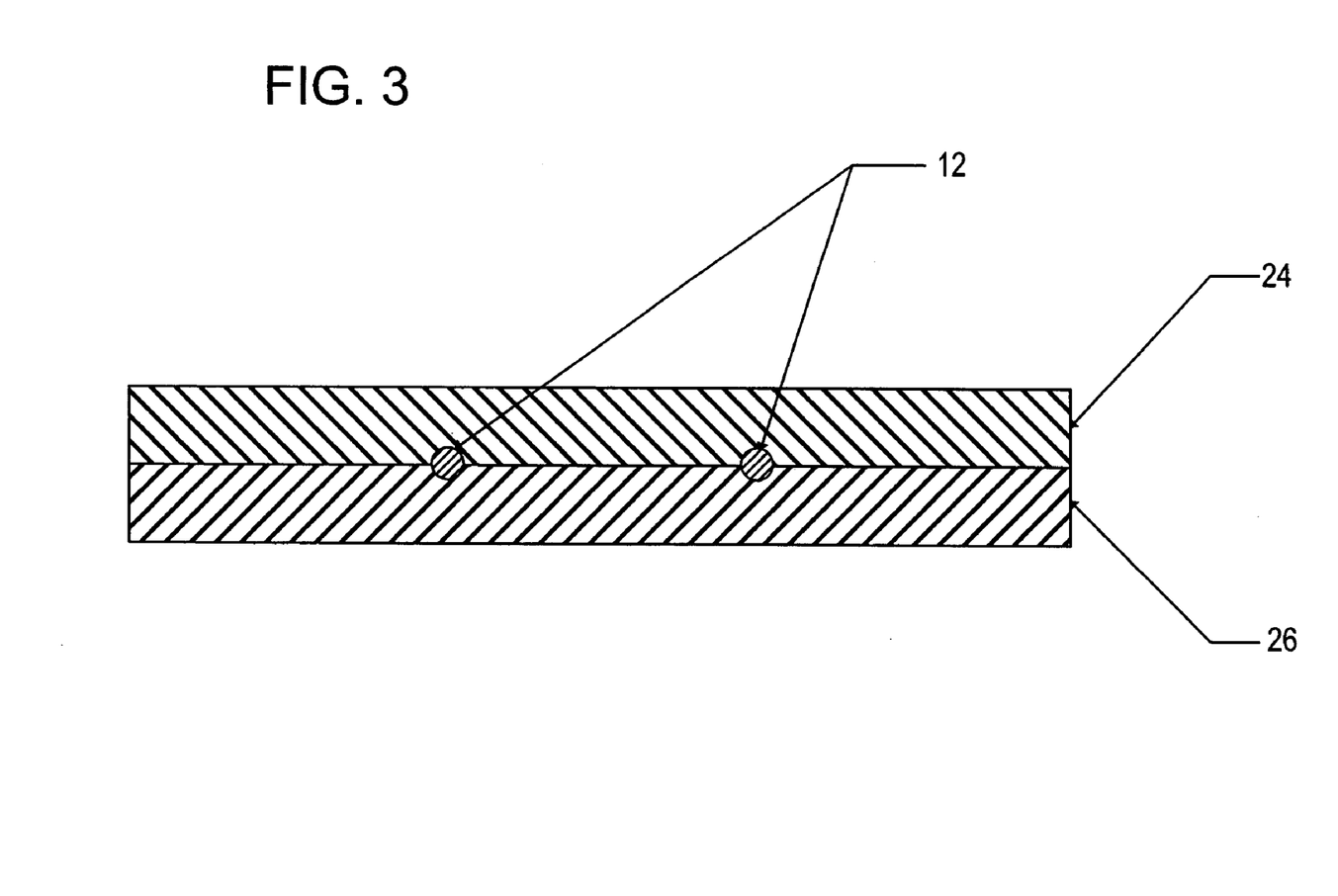
FIG. 3 is a cross sectional view of a heater of the present invention.

FIG. 3 is a cross sectional view of the invention as illustrated in FIG. 1. The invention includes a cover, upper layer 24, and a base, lower layer 26. Resistance wire 12 is sandwiched between the upper layer 24 and the lower layer 26. The upper and lower layers 24,26 can be made from reinforced fiberglass. In some cases the upper and lower layers 24,26 can be made from silicon and Vectran™. This type of material will provide protection from abrasion or other forces which may cause the heater to malfunction.

Figure 4:
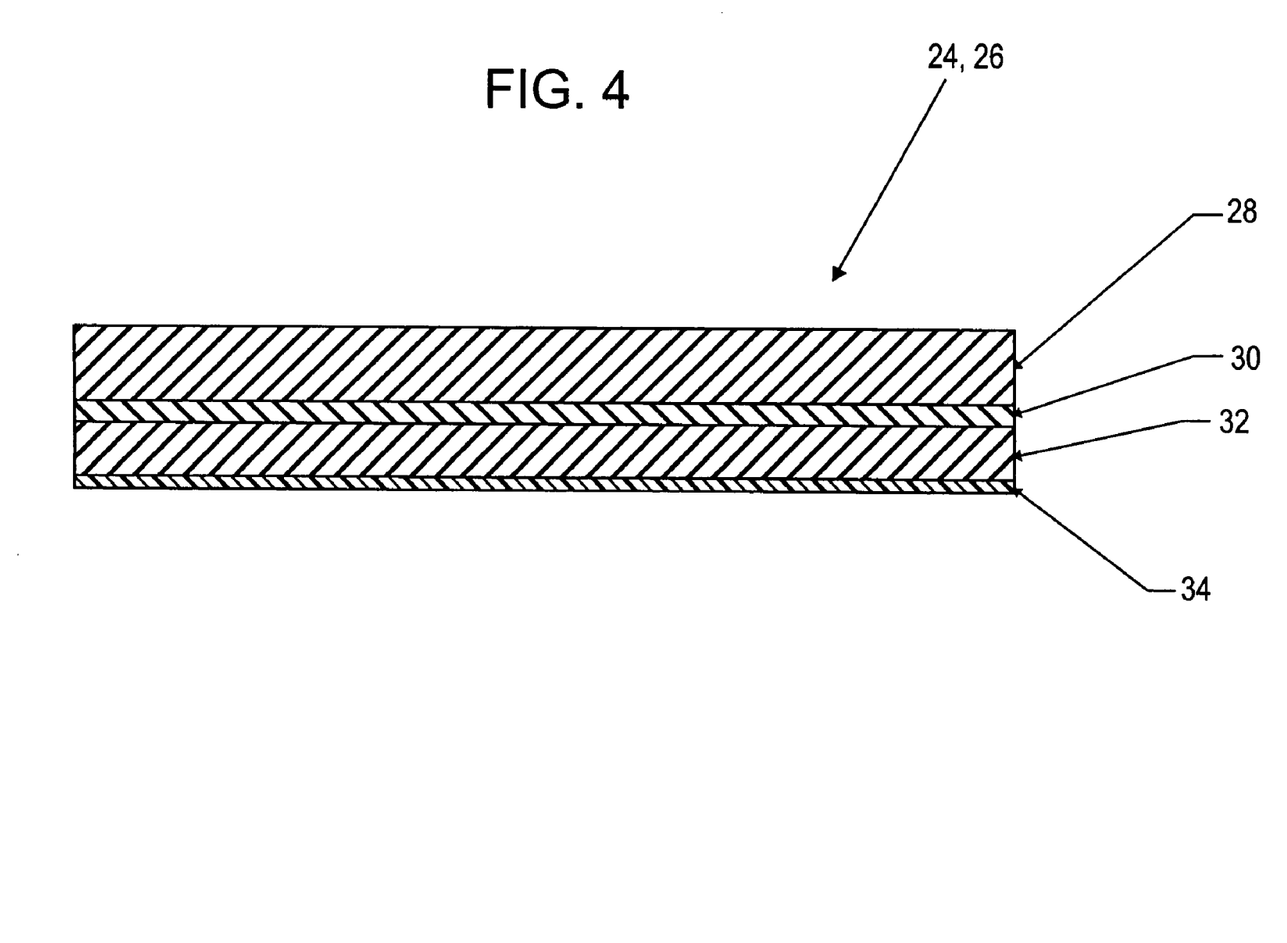
FIG. 4 is a cross sectional view of one layer of the heater of the present invention.

FIG. 4 is an illustration of either the upper layer 24 or the lower layer 26. Each of these layers can be made of identical material. The outer layer 28 is a protective layer and can be made out of a material which can endure and withstand abrasion. The outer layer 28 in some cases is made of Vectran™ which is a polyester-polyarylate fiber. In other embodiments of the invention this outer layer 28 can be a liquid crystal polymer fiber. The middle layer 30 can be a cured silicone, while layer 32 can be an uncured silicone layer (before assembly processing). A release liner 34, in some embodiments of the invention, can be attached to layer 32 so that it can be peeled back for use. One purpose for having a release liner is to protect the uncured silicone layer 32 (before assembly processing). In one embodiment of the invention, the thickness of layer 28 is 0.0195 inches, layer 30 is 0.006 inches, layer 32 is 0.014 inches and layer 34 is 0.003 inches.

In constructing the present invention, the resistance wire 12, which is helically wound around the electrically non-conductive core 13 (see FIG. 7), is placed between upper layer 24 and lower layer 26, as shown in FIG. 3, so that the inner layers 32 of uncured silicone are facing one another once the release liner 34 is peeled back to expose the uncured silicone.

The upper layer 24 and the lower layer 26 along with the helically wound resistance wire sandwiched between the upper and lower layers 24,26 are then put through a vulcanization process which cures the upper and lower layers such that it provides an assembly that cannot be taken apart thereby creating a unitary piece.

A layer of uncured silicone is used in order to lay the element wire in place long enough to complete the assembly process. The element wire in some cases is rolled into the uncured silicone layer since the rubber is soft. The wire becomes embedded and is not disturbed throughout the balance of the assembly and curing process. The cured silicone resides beneath the uncured silicone and is in place to prevent the heater element wire from protruding through to the outside surface. If this happened the protrusion would serve as a leak path for a very important electrical parameter that must be met at the top assembly level, dielectric withstanding voltage (DWV). The cured layer and the uncured layer after curing both contribute to dielectric strength as the silicone base material has an inherent dielectric strength expressed in volts per mil thickness. The heater element wire in the final product is thus embedded in cured silicone.

The resultant heater provides for a straight ribbon heater which can be installed straight onto the surface of a rigid fluid line or hose along its axis without damage from flexure or abrasion. However, in some embodiments of the invention the heater can be wound around a rigid fluid line or hose. In other embodiments, the heater can simply be attached to the rigid fluid line or hose using an adhesive or attachment mechanism.

Vigorous tests were performed on the resultant heater in the areas of abrasion resistance and flexure endurance. The heater performed phenomenally in each of these areas.

Figure 5:
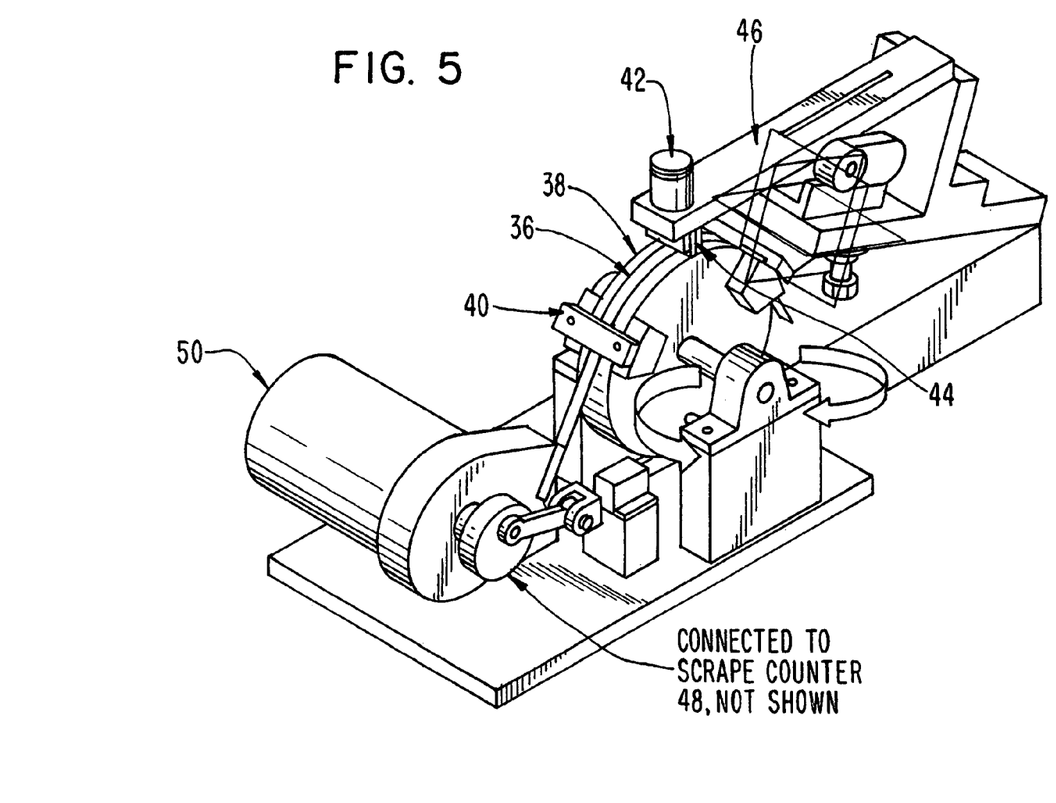
FIG. 5 is an illustration of a scrape abrasion test machine.

FIG. 5 is an illustration of a scrape abrasion test machine used to test for abrasion resistance. A test specimen 36, the heater, is placed on a drum 38. The test specimen 36 is clamped onto the drum 38 with clamps 40. A weight 42 weighs down scrape blade 44. Scrape blade 44 is put in contact with the specimen 36. An armature 46 is attached to the weight 42 and scrape blade 44 at one end and to a scrape cycle counter 48 at another end. An actuator 50 is connected to the drum 38.

In one embodiment of the invention the scrape cycle rate is set to approximately 60 cycles per minute. The scrape path is set to 2.00+/−0.3 inches in length on test specimen 36. The scrape blade 44 is made of tungsten carbide Kennametal grade K701 having a Rockwell hardness A92, minimum, and a chromium cobalt binder. The dimensions of scrape blade 44 can vary. In one embodiment of the invention scrape blade 44 has a width of 1.25+/−0.25 inches, a length of 2.0+/−0.3 inches, a thickness of 0.35+/−0.03 inches and a blade edge of 45+/−2 degrees and a 0.005+/−0.001 inch radius.

Weight 42 can vary. In one embodiment of the invention weight 42 is 1.00+/−0.03 pounds. The number of specimens used vary depending on the qualification standards. In some cases 6 specimens are required for qualification testing, each specimen being 15 inches in length. For conformance testing 2 specimens may be needed, each specimen being 15 inches in length.

The qualification test procedure can be set up so that the scrape abrasion test machine scrapes the specimen until a damage condition occurs when the scrapped area of the specimen is inspected with a 10× magnification. In one embodiment of the invention this is when the resistance wire shows through the outer cover. The number of test cycles performed is recorded once this damage condition occurs. This procedure is repeated for each of the six specimens.

In one embodiment of the invention, the average number of scrape cycles before damage is 131,720 cycles. It is noted that one scrape cycle consists of two scrape strokes.

Figure 6:
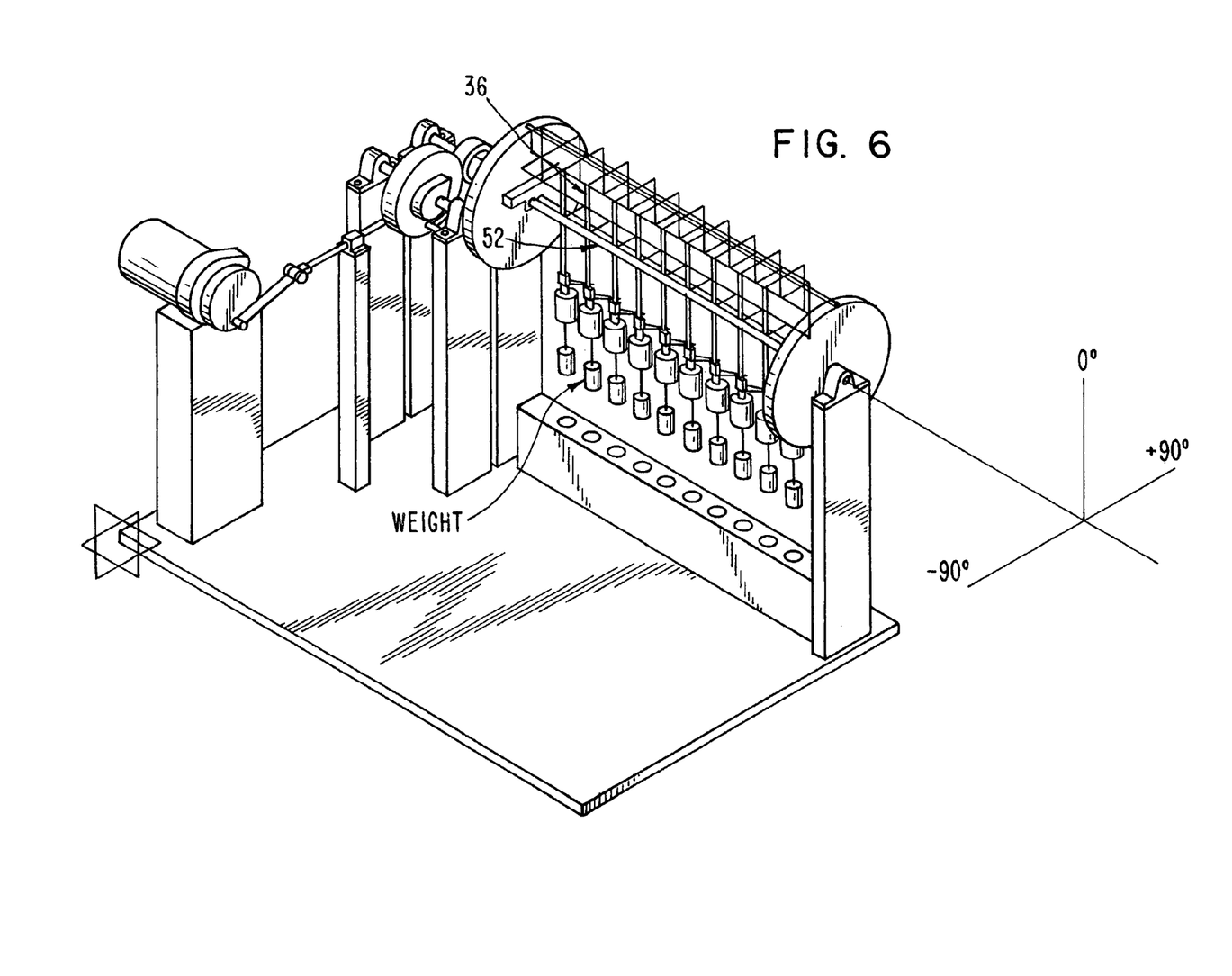
FIG. 6 is an illustration of a flexure test fixture.

FIG. 6 is an illustration of a flexure test fixture that is used to test flexure endurance. In one embodiment of the invention a minimum of three specimens 36 are placed between mandrels 52. Each of the specimens 36 are connected to an electrical circuit that will provide an indication when the conductors within the heater break. The specimen is twisted and flexed at a uniform rate of 18+/−2 cycles per minute in one embodiment of the invention, where a cycle is defined as movement from −90 degrees to 0 to +90 degrees or as specified. The number of cycles for the conductors is recorded until a break is indicated or until completion of the number of cycles required by the product specification. The condition of the insulation is also recorded. In other embodiments of the invention, tests are performed under specific temperatures and environmental conditions. In one embodiment of the invention the average number of cycles before damage is 13,754 cycles using four parallel conductor heater elements and 68,753 cycles using a single conductor heater element.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A heater consisting of:
   a base consisting of:
      an outer base layer comprising a fiber-reinforced composite selected from the group consisting of a polyester-polyarylate fiber and a liquid crystal polymer fiber,
      a middle base layer of cured silicone attached to said outer base layer; and
      an inner base layer of silicone that is uncured before assembly of the heater, attached immediately adjacent to said middle base layer,
   a resistance wire that is at least partially embedded into said inner base layer; and
   a cover that covers said resistance wire, said cover consisting of:
      an inner cover layer of silicone that is uncured before assembly of the heater covering said resistance wire,
      a middle cover layer of cured silicone attached immediately adjacent to said inner cover layer, and
      an outer cover layer comprising the fiber-reinforced composite selected from the group consisting of a polyester-polyarylate fiber and a liquid crystal polymer fiber attached to said middle cover layer.

2. The heater as recited in claim 1 further comprising a thermostat connected to said resistance wire.

3. The heater as recited in claim 1 further comprising lead wires connected to the ends of said resistance wire.

4. The heater as recited in claim 1 wherein said resistance wire comprises a plurality of resistance wires in parallel with one another.

5. The heater as recited in claim 1 wherein said resistance wire is at least partially embedded into the uncured silicone of said inner cover layer during assembly of the heater.

6. The heater as recited in claim 1 further comprising an electrically non-conductive core, wherein said resistance wire is wound around said core.

7. The heater as recited in claim 6 wherein said electrically non-conductive core is a fiberglass core.

8. The heater as recited in claim 6 wherein said resistance wire is helically wound around said electrically non-conductive core.

9. The heater as recited in claim 1 wherein said inner cover layer is attached to said inner base layer during assembly of the heater.

10. The heater as recited in claim 9 wherein said base and cover are attached by heat and pressure during assembly of the heater.

11. The heater as recited in claim 9 wherein said base and cover are attached through vulcanization during assembly of the heater.

12. The heater as recited in claim 9 wherein said base and cover are attached by peroxide cure reaction and heat during assembly of the heater.

13. A method for making a heater consisting of:
forming a base, wherein the forming a base consists of:
   forming an outer base layer comprising a first fiber-reinforced composite selected from the group consisting of a polyester-polyarylate fiber and a liquid crystal polymer fiber;
   attaching a middle base layer to said outer base layer, said middle base layer comprising cured silicone; and
   attaching an inner base layer immediately adjacent to said middle base layer, said inner base layer comprising uncured silicone;
embedding a resistance wire at least partially into the uncured silicone of said inner base layer;
forming a cover layer, wherein the forming a cover layer consists of:
   forming an inner cover layer of uncured silicone;
   attaching a middle cover layer of cured silicone to said inner cover layer, and
   attaching an outer cover layer immediately adjacent to said middle cover layer, the outer cover layer comprising a second fiber-reinforced composite comprising selected from the group consisting of a polyester-polyarylate fiber and a liquid crystal polymer fiber; and
covering the resistance wire with the cover layer, wherein the covering the resistance wire comprises attaching said inner cover layer to said inner base layer.

14. The method as recited in claim 13 wherein said attaching said inner cover layer to said inner base layer comprises heat treating said inner cover layer and said inner base layer.

15. The method as recited in claim 13 wherein said attaching said inner cover layer to said inner base layer comprises:
peroxide cure reaction of said inner base layer and said inner cover layer; and
heat treating said inner cover layer and said inner base layer.

16. The method as recited in claim 13 wherein said attaching said inner cover layer to said inner base layer comprises vulcanizing said inner cover layer and said inner base layer.

17. The method as recited in claim 13 wherein the embedding a resistance wire further comprises embedding a plurality of resistance wires in parallel with one another.

18. A system for heating consisting of:
means for providing a base consisting of:
   an outer base layer comprising a fiber-reinforced composite selected from the group consisting of a polyester-polyarylate fiber and a liquid crystal polymer fiber,
   a middle base layer of cured silicone attached to said outer base layer, and
   an inner base layer attached immediately adjacent to said middle base layer, said inner base layer comprising silicone that is uncured before assembly of the heater;
means for providing a resistance wire that is at least partially embedded into the uncured silicone of said inner base layer during assembly of the heater; and
means for providing a cover that covers said resistance wire, said cover consisting of:
   an inner cover layer covering said resistance wire, said inner cover layer comprising silicone that is uncured before assembly of the heater,
   a middle cover layer of cured silicone attached immediately adjacent to said inner cover layer, and
   an outer cover layer comprising the fiber-reinforced composite selected from the group consisting of a polyester-polyarylate fiber and a liquid crystal polymer fiber; and
means for attaching said cover to said base.

19. The system as recited in claim 18 wherein said means for attaching comprises a means for heat treating said cover and said base.

20. The system as recited in claim 18 wherein said means for attaching comprises:
peroxide cure reaction of said inner base layer and said inner cover layer; and
means for heat treating said cover and said base.

21. The system as recited in claim 18 wherein said means for attaching comprises vulcanizing said cover and said base.

22. The system as recited in claim 18 wherein said means for providing a resistance wire comprises providing a plurality of resistance wires in parallel with one another.

* * * * *